United States Patent [19]
May

[11] Patent Number: 5,548,427
[45] Date of Patent: Aug. 20, 1996

[54] SWITCHABLE HOLOGRAPHIC APPARATUS

[75] Inventor: Paul May, Cambridge, United Kingdom

[73] Assignee: Sharp Kabushiki Kaisha, Osaka, Japan

[21] Appl. No.: 375,595

[22] Filed: Jan. 20, 1995

[30] Foreign Application Priority Data

Jan. 21, 1994 [GB] United Kingdom ............... 9401194

[51] Int. Cl.$^6$ .............................. G02F 1/13; G02F 1/135; G02F 1/1335
[52] U.S. Cl. ............... 359/73; 359/497; 359/501; 359/303; 359/296
[58] Field of Search .............................. 359/63, 73, 65, 359/497, 498, 500, 501, 64, 303, 296

[56] References Cited

U.S. PATENT DOCUMENTS

| | | | |
|---|---|---|---|
| 2,647,440 | 8/1953 | Rehorn | 359/489 |
| 3,437,401 | 4/1969 | Siksai | 359/489 |
| 3,601,469 | 8/1971 | Siksai | 359/489 |
| 3,825,316 | 7/1974 | Amodei | 350/3.5 |
| 4,114,990 | 9/1978 | Mash et al. | 359/489 |
| 5,020,882 | 6/1991 | Makow | 359/64 |
| 5,121,235 | 6/1992 | Matino et al. | 359/64 |
| 5,122,890 | 6/1992 | Makow | 359/64 |
| 5,235,449 | 8/1993 | Imazeki et al. | 359/63 |
| 5,243,455 | 9/1993 | Johnson et al. | 359/73 |
| 5,327,285 | 7/1994 | Faris | 359/489 |
| 5,381,253 | 1/1995 | Sharp et al. | 359/70 |
| 5,434,687 | 7/1995 | Kawata et al. | 359/63 |

FOREIGN PATENT DOCUMENTS

| | | |
|---|---|---|
| 475049 | 7/1951 | Canada ............... 359/489 |
| 0451681 | 10/1991 | European Pat. Off. |
| 0450644 | 10/1991 | European Pat. Off. |
| 0449164 | 10/1991 | European Pat. Off. |
| 1534456 | 12/1978 | United Kingdom |
| 2250605 | 6/1992 | United Kingdom |

OTHER PUBLICATIONS

O'Brien et al, "Generalised Dynamic Holographic Interconnects Using Spatial Light Modulators," Mar. 1993, vol. 6, Technical Digest Series; OSA Meeting for Spatial Light Modulators and Applications.

Schadt et al, "Surface–Induced Parallel Alignment of Liquid Crystals by Linearly Polymerized Photopolymers", Jpn. J. Appl. Phys., vol. 31 (Jul. 1992) pp. 2155–2164.

Yakolev et al, "New Concept to Achieve Color LCD's with Linearly Photo–polymerized (LPP) LCD–Substrates," Aug.–Sep. 1993, SID. Euro Display '93, Strasbourg.

Optics Letters, vol. 18, No. 6, Mar. 15, 1993, Joseph E. Ford et al., "Polarization–Selective Computer–Generated Holograms", pp. 456–458.

Optical Computing, Palm Springs 1993, Technical Digest vol. 7, Opt. Soc. America, Mar. 1993, J. Ford et al., "Polarization–Selective Computer–Generated Holograms For Optical Multistage Interconnection Networks", pp. 258–261.

Optics Letters, vol. 16, No. 18, Sep. 15, 1991, Hirofumi Yamakazi et al., "4×4 Free–Space Optical Switching Using Real–Time Binary Phase–Only Holograms Generated By A Liquid–Crystal Display", pp. 1415–1417.

Optics Letters, vol. 17, No. 11, Jun. 1992, Masayuki Kato et al., "Multichannel Optical Switch That Uses Holograms", pp. 769–771.

*Primary Examiner*—Jon W. Henry
*Attorney, Agent, or Firm*—Renner, Otto, Boisselle & Sklar

[57] ABSTRACT

A switchable holographic device which includes a first polarizer having a spatially varying direction of polarization. The device also includes a liquid crystal device arranged to act as a controllable phase plate, the liquid crystal device having a predetermined phase shift in one state and substantially no birefringent activity in another state. The liquid crystal device is thus controllable to selectively alter the polarization of at least some of the radiation passing therethrough or to have substantially no optical activity. An output polarizer receives the radiation from the liquid crystal device so that, depending on the state of the liquid crystal device, the hologram is replayed or not replayed.

25 Claims, 3 Drawing Sheets

5,548,427

SWITCHABLE HOLOGRAPHIC APPARATUS

The present invention relates to a switchable holographic apparatus. Such a device is suitable for use in optical computing, optical data storage and optical beam steering applications.

D. C. O'Brien, T. D. Wilkinson, R. J. Mears, and W. A. Crossland, in a paper entitled "Generalised dynamic holographic interconnects using spatial light modulators", Light modulators and applications, OSA meeting, Palm Springs, March 1993, disclose a computer generated hologram using a ferroelectric liquid crystal spatial light modulator (SLM) to provide binary phase modulation. The SLM is illuminated with a collimated beam of light, and the light emerging from the SLM is transformed using a lens so as to replay the hologram. The phase changes provided by the SLM form the hologram. In order to replay relatively complex holograms, and especially holograms having irregular dot patterns, each element of the SLM needs to be addressed in parallel. This may impose severe pin out requirements on the SLM and result in bulky systems.

EP-A-451 681 discloses the use of an electrically addressable liquid crystal display for forming a hologram. The hologram is created by controlling the individual pixels of the display so as to generate a suitable pattern of phase changes.

EP-A-449 164 also discloses use of a pixellated LCD to generate a hologram. Each pixel is individually controlled in order to generate the hologram.

EP-A-450 664 also discloses the use of a pixellated LCD to form a hologram in accordance with image data presented to the LCD.

Polarisation sensitive photopolymers may be used to form relatively complex retarder patterns, as reported by M. Schadt, K. Schmitt, V. Kozinkov and V. Chigrinov "Surface-induced parallel alignment of liquid crystals by linearly polymerised photopolymers" Jap journal of applied physics. Vol 31(1992) p2155–2164 and D. A. Yakolev, G. V. Simonenko, V. M. Kozenkov, V. G. Chigrinov and M. Schadt, "New Concept to Achieve Color LCDs with Linearly Photopolymerised (LPP) LCD-Substrates" in a paper presented to Eurodisplay 93, Strasbourg.

According to a first aspect of the present invention, there is provided a switchable holographic apparatus, comprising a first polariser having a spatially varying direction of polarisation, a switchable retarder switchable between first and second states, and a second polariser, the switchable retarder being disposed in a radiation path between the first and second polarisers.

It is thus possible to provide a device in which the radiation exiting from the second polariser is either substantially uniform or is spatially modulated in accordance with a pattern on the first polariser, depending on whether the retarder is in its first or second state. The modulation may be phase modulation or amplitude modulation.

Advantageously the first polariser is pixellated.

Preferably the first polariser comprises a plane polariser for polarising electromagnetic radiation along a first direction and a patterned retarder having a spatially varying retardation.

Alternatively, the spatially varying polarisation of the first polariser may be provided by regions thereof having different directions of polarisation. It is known, for example, from Schadt et al referred to hereinabove, that some linearly polymerisable photopolymers are dichroic within a restricted range of wavelengths. Such a photopolymer can be used to form a patterned polariser for use with light within that restricted range of wavelengths.

Preferably the patterned retarder is pixellated. Some or all of the pixels may be arranged to act as phase plates. Preferably the optical axis of each pixel is individually controllable.

Preferably the switchable retarder is a liquid crystal device.

Advantageously the liquid crystal device is pixellated, each pixel of the liquid crystal device being associated with a plurality of pixels of the first polariser.

Advantageously, in use, the electromagnetic radiation used is light. In this context, light includes wavelengths falling within the infra-red, visible and ultra-violet regions of the spectrum.

According to a second aspect of the present invention, there is provided an optical beam steering device, comprising spatially modulated polarising means for providing a spatially modulated source of light comprising a plurality of regions producing plane polarised light polarised along one of a first direction and a second direction, an electrically controllable modulator having controllable birefringence for selectively controlling the directions of polarisation of the polarised light, so as to allow a hologram formed in the spatially modulated polarising means to be replayed, and a polariser arranged to receive light from the modulator and to transmit components of light polarised along a third direction.

The present invention will be further described, by way of example, with reference to the accompanying drawings, in which.

Figure 1:
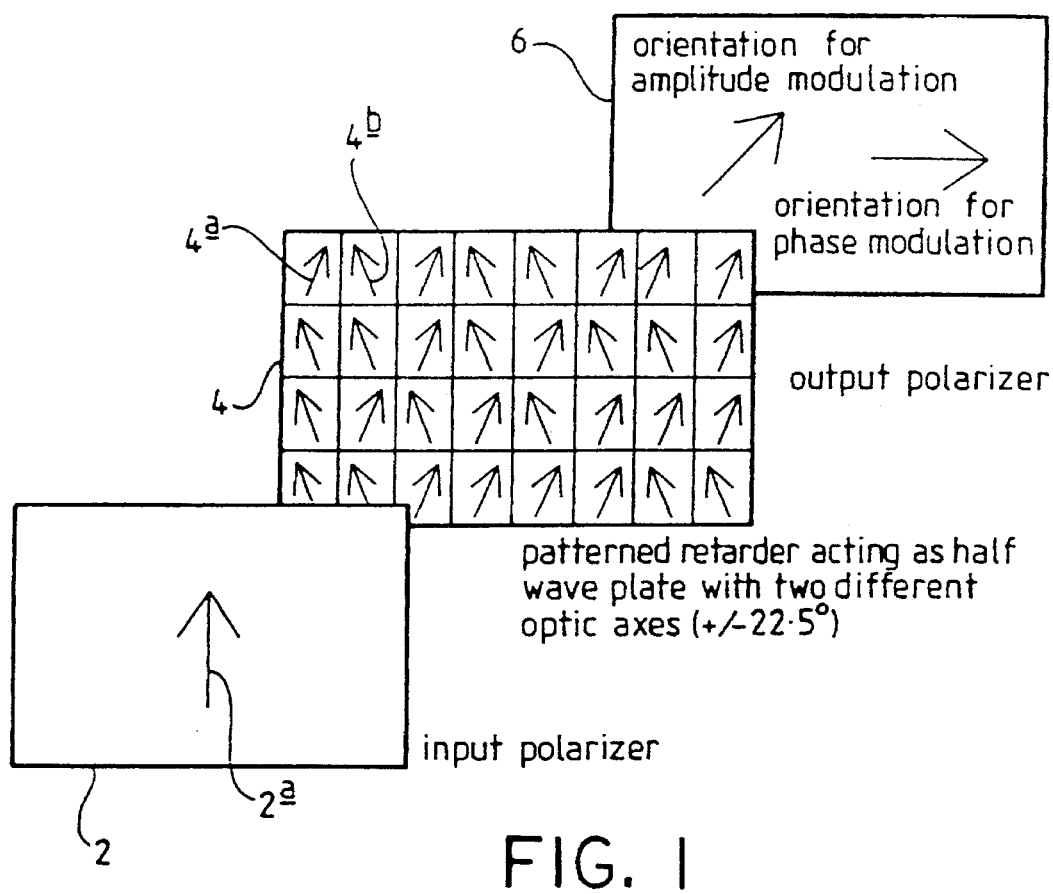
FIG. 1 is a schematic diagram of an apparatus for forming a fixed phase or amplitude hologram.

The apparatus shown in FIG. 1 comprises an input polariser 2, a patterned retarder 4 and an output polariser 6. The input polariser provides linearly polarised light to the patterned retarder 4. In this example, the light is vertically polarised, as indicated by the arrow 2a. The patterned retarder 4 comprises a plurality of first and second pixels 4a,4b, respectively. Each pixel acts as a half-wave plate. The fast axis of retardation of each pixel is indicated by the arrows within each pixel. The pixels 4a have their fast axis rotated by 22.5° in a clockwise direction with respect to the direction of polarisation of the polariser 2, whereas the pixels 4b have their fast axis rotated by 22.5° in an anti-clockwise direction with respect to the direction of polarisation of the polariser 2. Each half wave plate introduces a $\lambda/2$ phase shift between components of light parallel and perpendicular to the fast axis of the half wave plate. The effect of each pixel is such that the light exiting each pixel has a polarisation at an angle with respect to the plane of polarised light incident on each pixel which is double the angle between the plane of polarisation of the incident polarised light and the fast axis of each pixel. Thus light emerging from the retarder 4 is polarised to an angle of ±45° with respect to the input polariser. The direction of polarisation of the output polariser 6 may be perpendicular with respect to the input polariser 2 in order to form a phase modulated hologram or at ±45° with respect to the input polariser in order to form an amplitude modulated hologram.

Figure 2:
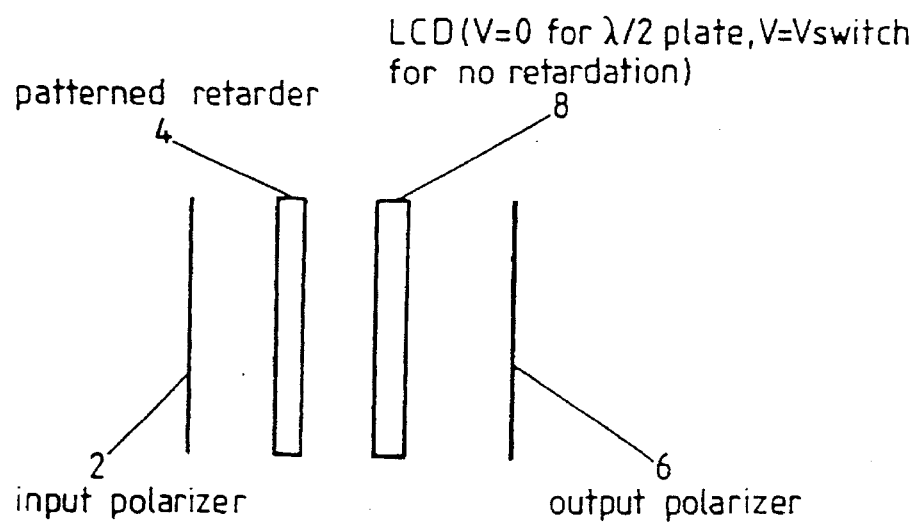
FIG. 2 is a side view of an apparatus constituting an embodiment of the present invention.
Figure 3:
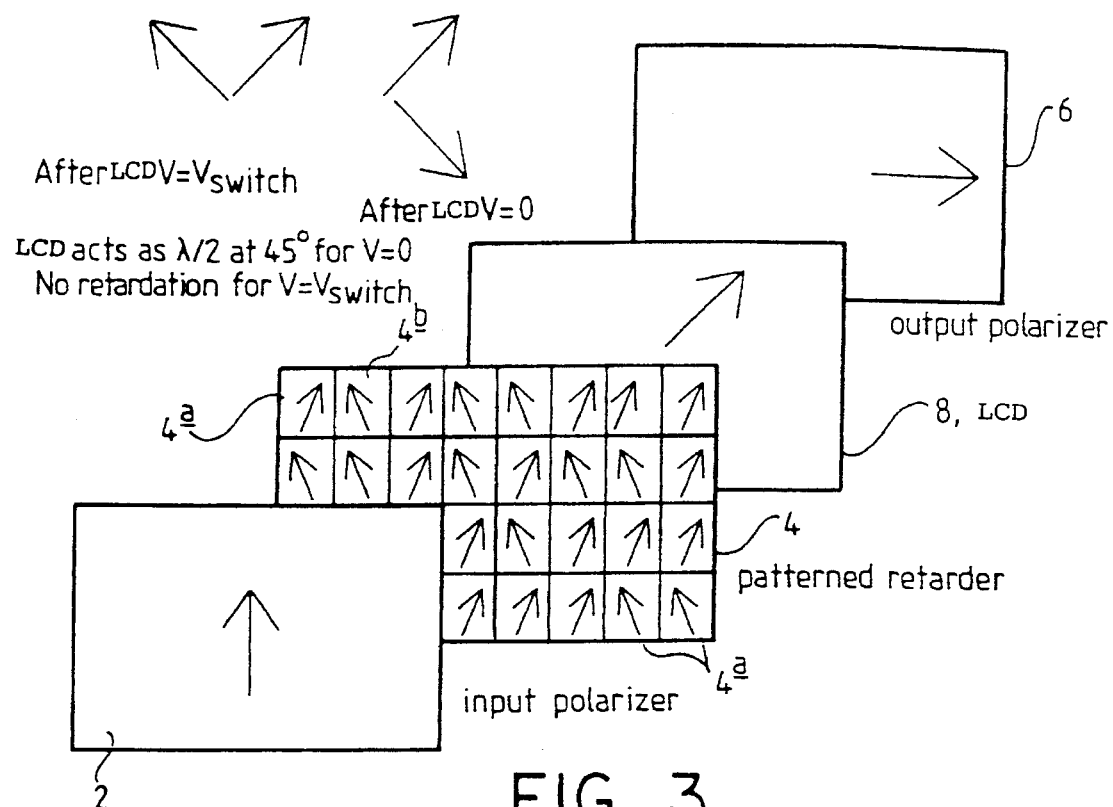
FIG. 3 is a schematic view of an apparatus for forming a switchable phase hologram.

An electrically controllable holographic device is shown in FIG. 2. An input polariser 2, a patterned retarder 4, which together with the input polariser 2 forms a first polariser, and an output polariser 6 are arranged as described with reference to FIG. 1. Additionally a liquid crystal device 8 is interposed between the patterned retarder 4 and the output polariser 6. Such an arrangement can be used to produce a phase hologram when the output polariser 6 is crossed with respect to the input polariser 2, as shown in FIG. 3. As before, the retarder 4 has a plurality of half wave plates having fast axes of retardation at an angle of ±22.5° with the plane of polarisation of the input polariser 2. The liquid crystal device 8, such as a π cell, exhibits zero birefringence in the presence of a suitable control voltage. The direction of polarisation of the light produced after passing through each pixel of the retarder 4 is unaffected by its passage through the liquid crystal device 8, i.e. it is still polarised at ±45° with respect to the input polariser 2, and hence at 45° and 135° with respect to the output polariser 6. The output polariser resolves the light into components parallel to the plane of polarisation of the polariser. Thus a pattern of phase shifts of 0 and π radians are formed, and consequently the phase hologram is replayed.

In the low applied voltage state, the liquid crystal device is arranged to act as a half wave plate having its optic axis at an angle of 45° with respect to the direction of polarisation Of the input polariser. Thus the optic axis is parallel to one of the directions of polarisation of light from the pixels 4a, and perpendicular to the direction of polarisation of the light from the pixels 4b. As noted hereinabove, the action of a half wave plate is to produce light whose angle with the plane of polarisation of the incident light is double the angle that the incident light makes with the optic axis. Thus light from pixels 4a is unaffected, whereas light from the pixels 4b undergoes a phase shift of π radians, as shown in FIG. 3. The light passing through the liquid crystal device 8 is now polarised at an angle of ±45° with respect to the direction of polarisation of the output polariser 6. The polariser 6 resolves the light into components and transmits the component parallel to the direction of polarisation of the polariser. The horizontal components of light due to the pixels 4a and 4b are in phase with each other. Thus there is no spatially modulated phase shift in the light exiting from the output polariser 6 and consequently the hologram is not visible.

For the arrangement described hereinabove, a loss of 50% of the light occurs in both the "hologram on" and "hologram off" states. Other retarder configurations are possible, but may result in unequal losses in the on and off states. It is possible to simultaneously encode analogue amplitude information in addition to binary phase information by varying the optic axis of the pixels of the patterned retarder away from ±22.5°. The phase hologram can still be controlled as described hereinabove, although in the off state the inverse of the amplitude modulation is observable. For example, if the optic axis of a pixel is 40° from the direction of polarisation of the input polariser, then the amplitude in the on state is 98%. In the off state, no phase modulation occurs, but transmission of the pixel is reduced to 2%.

In an alternative arrangement, an electrically or optically addressed ferroelectric liquid crystal device (FLC) may be substituted for the patterned retarder 4. The FLC acts as a reprogrammable patterned retarder. The liquid crystal device 8 is then used to switch the hologram represented on the FLC on-and off, such an arrangement allows faster switching than is possible-by direct addressing of the FLC.

As a further alternative, a FLC may be placed in series with the patterned retarder 4 and be arranged to act as a patterned switchable retarder, thus allowing the switching on and off of sub-holograms formed by the pixels within a region of the patterned retarder 4.

Figure 4:
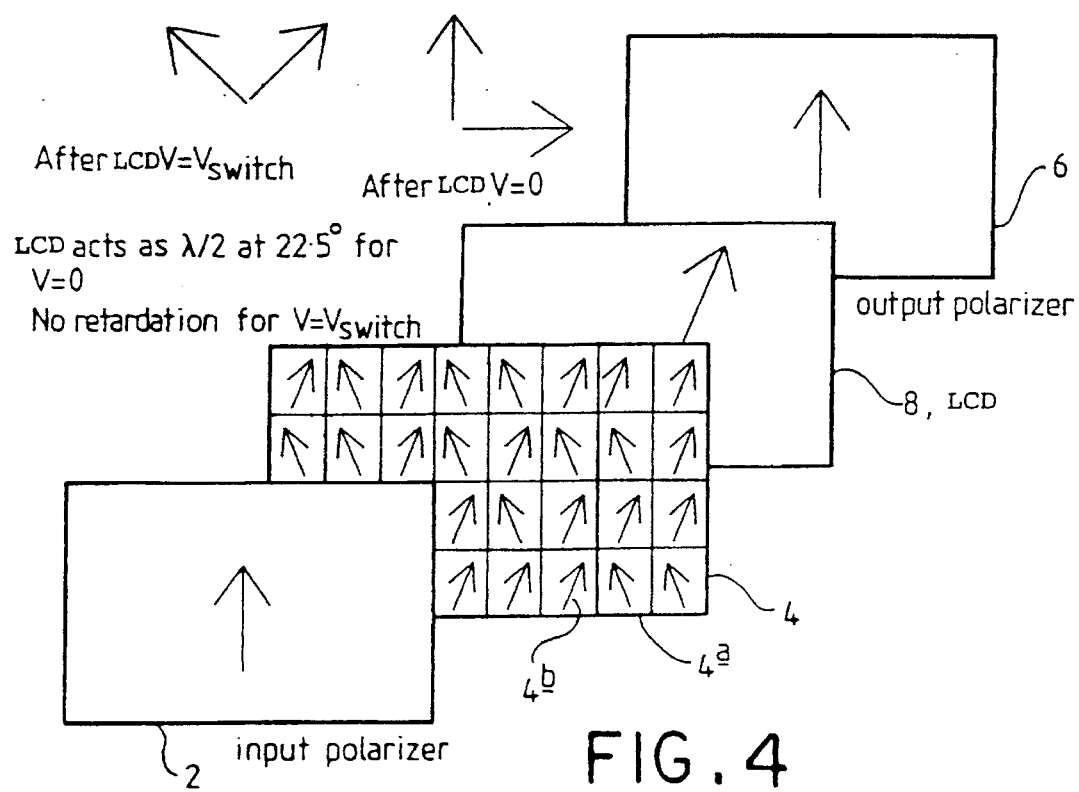
FIG. 4 is a schematic view of an apparatus for forming a switchable amplitude hologram.

An amplitude modulated hologram may be formed by the arrangement illustrated in FIG. 4. The output polariser 6 is parallel to the input polariser 2. Additionally, the liquid crystal device 8 is arranged to act, in the low voltage state, as a half wave plate, but the optic axis is now at an angle of 22.5°. As before, the light emerging from the pixels is at ±45°. When the LCD 8 is supplied with a relatively high voltage $V_{switch}$, the LCD does not display birefringence, the polarisation of the light from the pixels is unaffected, and the vertical component of the light is selected by the output polariser 6. The vertical component of the light is the same magnitude for light emanating from pixels 4a and pixels 4b. Thus the output from the output polariser is of substantially uniform intensity.

When a zero or low voltage is applied to the liquid crystal device, it functions as a half wave plate. Consequently the light emerging from the pixels 4b is rotated to be plane polarised parallel to the axis of the input polariser 2, whereas the light from pixels 4a is rotated to be plane polarised perpendicular to the axis of the input polariser 2. Thus only light from the pixels 4b is transmitted by the output polariser 6, and consequently the amplitude modulation is replayed.

Other arrangements are possible, such as quarter wave patterned retarders having the fast axes of each type of pixel perpendicular to one another and the liquid crystal device 8 arranged to act as a switchable quarter wave plate having its fast axis parallel to one of the groups of pixels of the patterned retarder. The device could have either parallel or crossed input and output polarisers and the order of the liquid crystal device and the patterned retarder may be interchanged.

A sequence of such switchable holographic elements may be formed by placing the devices in series, thereby giving rise to 2"different holograms, where n is the number of devices, and may typically be 3 or 4. In order to be additive, the devices need to be in close contact, or alternatively the holograms require relatively long working distances.

Figure 5:
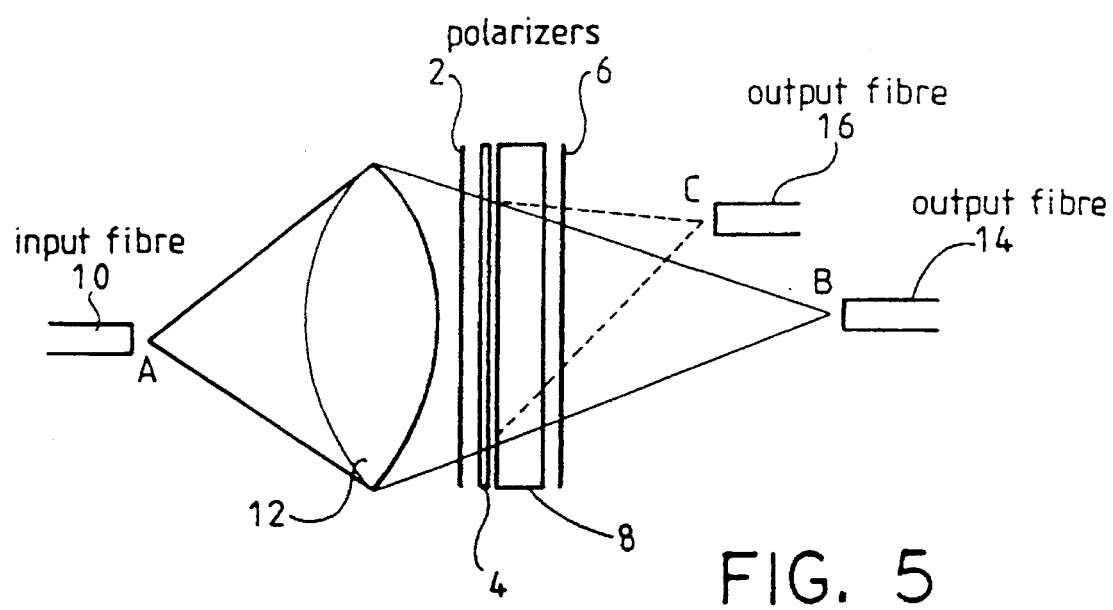
FIG. 5 is a schematic diagram of an optical beam switcher constituting an embodiment of the present invention.

FIG. 5 shows a beam switching device comprising: an input polariser 2, a patterned retarder 4, a liquid crystal device 8, and an output polariser 6, as described hereinabove; and an input fibre 10, a lens 12 and first and second output fibres 14 and 16. Light from the input fibre (at position A) is collected by the lens 12 and imaged towards a point B at an end of the first output fibre 14. The polarisers 2,6, the patterned retarder 4 and the liquid crystal device 8 are in the optical path between the lens 12 and the output fibre 14. When the liquid crystal device is switched so as to replay the hologram encoded on the patterned retarder 4, the holographic image is arranged to steer the beam away from point B and towards point C at the end of the second output fibre 16. The hologram is designed to provide both a beam steering and a focusing action, i.e. it is an off-centre zone plate. The focal length of the zone plate may typically be between 1 mm and 1 meter and may be optimised for particular wavelengths.

Such a zone plate would be difficult to create using a directly addressed liquid crystal device, because of the problems of addressing concentric circles of elements, and also because of the spatial resolution that would be required for simulating the shortest focal length lenses.

Figure 6:
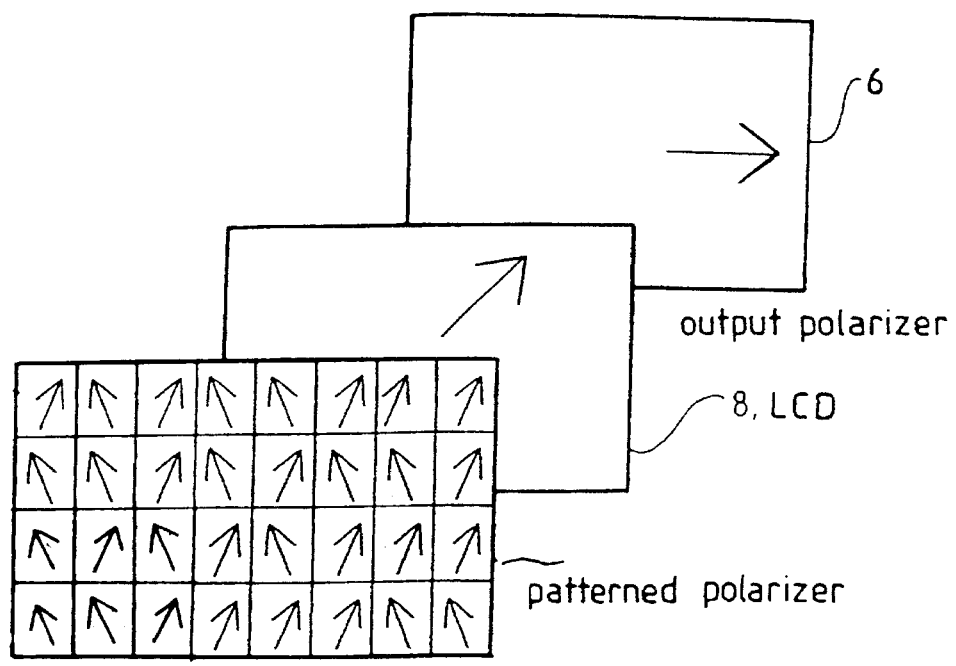
FIG. 6 is a schematic view of an alternate embodiment for forming a switchable hologram.

FIG. 6 shows an alternate embodiment of a switchable holographic apparatus. In this case, the spatially varying polarisation of the first polariser is provided by a patterned polariser instead of the combined plane polariser and patterned retarder having a spatially varying retardation. It is known, for example, from Schadt et al. referred to hereinabove, that some linearly polymerisable photopolymers are dichroic within a restricted range of wavelengths. Such a photopolymer can be used to form a patterned polariser for use with light within that restricted range of wavelengths.

It is thus possible to provide a device in which a highly complex holographic image is pre-recorded on a patterned retarder, and in which a liquid crystal device is easily and quickly controlled to selectively replay the image. Such devices may be combined in series or in parallel to provide a diverse and complex pattern of holographic images to be rapidly selected. Such devices may be used as switchable Fourier plane filters for optical computing applications, optical data storage, and beam steering for optical disc and telecommunication applications.

What is claimed is:

1. A switchable holographic apparatus, comprising:
   a first polariser having a spatially varying direction of polarisation,
   a switchable retarder switchable between first and second states, and
   a second polariser, wherein
   the switchable retarder is disposed in a radiation path between the first and second polarisers,
   the first polariser comprises a plurality of first pixels having respective directions of polarisation arranged at a first angle to a first direction, and
   the switchable retarder is pixellated and each pixel of the switchable retarder is associated with a plurality of pixels of the first polariser.

2. An apparatus according to claim 1, wherein the first polariser further comprises a plurality of second pixels having respective directions of polarisation arranged at a second angle to the first direction.

3. An apparatus according to claim 2, wherein the first and second angles are of equal magnitude and opposite sign.

4. An apparatus according to claim 1, wherein the first polariser comprises a plane polariser for polarising electromagnetic radiation along a first direction and a patterned retarder having a spatially varying retardation.

5. An apparatus according to claim 4, wherein the patterned retarder comprises a plurality of first pixels having respective optic axes arranged at a first angle to the first direction.

6. An apparatus according to claim 5, wherein the patterned retarder further comprises a plurality of second pixels having respective optic axes arranged at a second angle to the first direction.

7. An apparatus according to claim 6, wherein the first and second angles are of equal magnitude and opposite sign.

8. An apparatus according to claim 5, wherein the pixels are arranged to act as phase-plates.

9. An apparatus according to claims 4, wherein the patterned retarder is a pixellated ferroelectric liquid crystal device, the pixels being controllable so as to form a programmable retarder.

10. An apparatus according to claim 1, wherein the switchable retarder exhibits substantially no birefringence in the first state and acts as a phase plate in the second state.

11. An apparatus according to claim 1, wherein the switchable retarder is arranged, when in the second state, to act as a half wave plate.

12. An apparatus according to claim 6, wherein the switchable retarder exhibits substantially no birefringence in the first state and acts as a half wave plate in the second state, and the first and second pixels are arranged to act as half wave plates.

13. An apparatus according to claim 12, wherein the direction of polarisation of the second polariser is crossed with respect to that of the plane polariser, the switchable retarder has an optic axis at substantially 45 degrees with respect to the first direction and the apparatus is arranged to replay a phase hologram.

14. An apparatus according to claim 12, wherein the direction of polarisation of the second polariser is parallel to that of the plane polariser, the switchable retarder has an optic axis at substantially 22.5 degrees with respect to the first direction and the apparatus is arranged to replay an amplitude hologram.

15. An apparatus according to claim 12, wherein the optic axes of the first and second pixels are oriented at an angle of +22.5 degrees and −22.5 degrees with respect to the first direction, respectively.

16. An apparatus according to claim 6, wherein the switchable retarder exhibits substantially no birefringence in the first state and acts as a phase plate in the second state, and the first and second pixels are arranged to act as quarter wave plates, the optic axes of the first and second pixels are perpendicular to one another and the switchable retarder is arranged, when in the second state, to act as a quarter wave plate having an optic axis substantially parallel to the optic axis of the first pixels.

17. An apparatus according to claim 16, wherein the direction of polarisation of the second polariser is crossed or parallel with that of the plane polariser.

18. An apparatus according to claim 4, wherein the patterned retarder is formed of a photopolymer.

19. An apparatus according to claim 1, wherein the switchable retarder is a liquid crystal device.

20. An apparatus according to claim 19, wherein the switchable retarder is a π cell.

21. An apparatus according to claim 1, wherein the switchable retarder is pixellated.

22. An apparatus according to claim 5, wherein the switchable retarder is pixellated and each pixel of the switchable retarder is associated with a plurality of pixels of the first polariser.

23. A beam steering apparatus comprising a switchable holographic device comprising;
   a first polariser having a spatially varying direction of polarisation,
   a switchable retarder switchable between first and second states, and
   a second polariser, wherein
   the switchable retarder is disposed in a radiation path between the first and second polarisers,
   the first polariser comprises a plurality of first pixels having respective directions of polarisation arranged at a first angle to a first direction, and
   the switchable retarder is pixellated and each pixel of the switchable retarder is associated with a plurality of pixels of the first polariser.

24. An optical beam steering apparatus, comprising:
   spatially modulated polarising means for providing a spatially modulated source of light comprising a plurality of regions producing plane polarised light polarised along one of a first direction and a second direction, an electrically controllable modulator having controllable birefringence for selectively controlling the directions of polarisation of the polarised light, so as to allow a hologram formed in the spatially modulated polarising means to be replayed, and a polariser arranged to receive light from the modulator and to transmit components of light polarised along a third direction, wherein the electrically controllable modulator is pixellated and each pixel of the electrically controllable modulator is associated with the plurality of regions of the spatially modulated polarising means.

25. An apparatus according to claim 1, wherein said first polariser is a patterned polariser.

* * * * *